(12) United States Patent
Sanders (10) Patent No.: US 7,266,899 B2
(45) Date of Patent: Sep. 11, 2007

(54) SPEED LEVEL

(76) Inventor: Mark Sanders, 407 D St. SW., Ardmore, OK (US) 73401

( * ) Notice: Subject to any disclaimer, the term of this patent is extended or adjusted under 35 U.S.C. 154(b) by 101 days.

(21) Appl. No.: 10/831,259

(22) Filed: Aug. 18, 2004

(65) Prior Publication Data

US 2006/0037206 A1  Feb. 23, 2006

(51) Int. Cl.
*B43L 7/027* (2006.01)

(52) U.S. Cl. .................. 33/429; 33/474; 33/DIG. 20; 52/749.11

(58) Field of Classification Search .......... 33/429, 33/333, 334, 354, 382, 404, 408, 409, 410, 33/474, 482, 526, 527, DIG. 20, 413, 414, 33/451; 52/747.11, 749.11, 719.11
See application file for complete search history.

(56) References Cited

U.S. PATENT DOCUMENTS

| | | | | |
|---|---|---|---|---|
| 161,155 | A * | 3/1875 | Ransom | 33/382 |
| 586,082 | A * | 7/1897 | Weigert et al. | 33/353 |
| 697,594 | A * | 4/1902 | Alteneder | 33/474 |
| 1,637,580 | A * | 8/1927 | Lowry et al. | 52/389 |
| 2,728,989 | A * | 1/1956 | Laggren | 33/348 |
| 4,653,194 | A * | 3/1987 | Kim | 33/429 |
| 4,745,689 | A | 5/1988 | Hiltz | |
| 4,813,149 | A | 3/1989 | Herkimer | |
| 5,142,787 | A | 9/1992 | Dadisman | |
| 5,263,260 | A | 11/1993 | Smith | |
| 5,414,938 | A | 5/1995 | Meek | |
| 5,913,777 | A * | 6/1999 | Gerber | 52/35 |
| 5,933,974 | A * | 8/1999 | Walters et al. | 33/474 |
| 5,974,677 | A | 11/1999 | Butwin | |
| 6,029,360 | A * | 2/2000 | Koch | 33/382 |
| D432,928 | S | 10/2000 | Garrett | |
| 6,209,213 | B1 | 4/2001 | Moe | |
| 6,230,416 | B1 * | 5/2001 | Trigilio | 33/474 |
| 6,314,652 | B1 | 11/2001 | English | |
| 6,725,556 | B1 * | 4/2004 | Graham | 33/474 |

\* cited by examiner

*Primary Examiner*—R. Alexander Smith
(74) *Attorney, Agent, or Firm*—Derrick W. Harvey (57) ABSTRACT

The present invention provides a combination tool for use by an individual workman, without resorting to assistance by another workman, for laying out horizontal and plumb lines in a confined space, such as that found in a shower stall, bathtub enclosure, or fireplace. The invention has a body in the shape of an isosceles triangle. Centrally positioned referencing levels align with the centerlines of each leg of the triangle. The referencing levels are duplicated in order to provide better accuracy of measurement. The tool is of sufficient thickness to allow the removable attachment of a chalk line clip to one of two blunted ends of the tool so that a single workman can extend and snap chalk lines on a surface of interest. A tiler may use the tool of the present invention to practice an inventive technique of laying tile in an efficient and aesthetically pleasing manner.

14 Claims, 6 Drawing Sheets

SPEED LEVEL

FIELD OF THE INVENTION

The present invention relates to tools used in the construction industry by tilers, carpenters, masons, and other craftsmen. More specifically, this invention concerns a tool that can combine a variety of functions useful in numerous design and construction applications.

BACKGROUND OF THE INVENTION

Tilers, carpenters, masons and other craftsmen require tools that perform a variety of functions, such as leveling horizontal, vertical and 45° surfaces and plumbing, cutting, and extending lines on floors, walls, and cabinet ceilings. Devices used to aid in laying out perpendicular lines on horizontal surfaces often are constructed in rigid triangular-shapes that have hypotenuses, i.e. bases, with varying lengths. These bases, which are longer than the other sides, are often selected to be used as a straight edge for connecting marked points and extending the perpendicular lines from a wall or other reference line. A base acting as a straight edge in such a device must be capable of extending lines in length increments that do not inherently burden the user in two conflicting regards. First, the base should be of such sufficient length to minimize the number of extensions that the tiler is required to make from the reference point. One such layout tool, Butwin, U.S. Pat. No. 5,974,677 ("The '677 patent"), utilizes a 3-4-5 foot triangle, identified by the trademark "A Square"™, to address this issue. Second, though a device with a base having sufficient length provides the benefit of requiring fewer line extensions, layout tools with bases of five or even four feet can restrict their applicability in some instances. Particularly, tilers often work in confined spaces that would preclude the use of layout tools with bases of four feet or more; for example, standard shower enclosures generally have a wall that measures three and a half feet wide.

In shower tiling, tile pattern and alignment are the two most important aspects of ensuring both aesthetic and functional excellence. Shower tilers achieve tile alignment on a floor by first establishing a level horizontal surface adjacent to one of the walls, or at a perimeter of the floor. Then, using concrete or another appropriate agent, the tiler creates a downward slope to a centrally located drain in the shower, usually about 0.25 inches per foot, so that water naturally gravitates towards the drain. Next, the tiler will find the horizontal and vertical perpendicular to the perimeter of the shower floor. The tiler will make additional measurements if a wall tile pattern must align with the floor tile pattern. In laying tile in a vertical plane or up the shower wall, extreme care is necessary while setting the first row of tile. If the wall is uneven or not level, any error will be magnified as the tile rows are added up the wall, resulting in misshapen aesthetic appearance and unacceptable tile drifting and leakage. Thus, setting the initial row of tiles correctly is integral in ensuring the accuracy of the remaining rows. These concepts in shower tiling may also be extended to other related endeavors in confined spaces where tools with four and five foot bases are too large, such as setting a built-in bathtub or a fireplace.

At the same time, those in the aforementioned industries are charged with creating straight lines on floors, where the lines are perpendicular to the walls. These perpendicular lines must retain an accurate line of 90° from the walls over a substantial length of floor. The act of marking straight lines across a wide expanse of floor normally requires two people. The traditional method of marking lines requires a first person to hold a first end of the chalk line and a second person to hold a second end of the chalk line, carefully aligning the chalk line over the marks made to extend the perpendicular line from the wall. Dadisman, U.S. Pat. No. 5,142,787, discloses a means and method for defining a layout utilizing pluralities of triangles and tethering cables as well as multiple points of anchor. Other methods of similarly complex and multi-tooled solo marking have also attempted to solve the issue of reducing manpower while maintaining an easy, efficient method of laying out a surface.

Uneven surfaces in a layout area may adversely affect the overall appearance and long-term structural integrity of the medium being set, such as a tile floor. Conventional layout tools may contain one spirit level, which is an instrument for ascertaining whether a surface is horizontal, vertical, or at a 45° angle. The spirit level typically consists of an encased, liquid-filled tube containing an air bubble that moves to a center window when the instrument is set on an even plane. However, in using a single spirit level, its accuracy is limited by two problems. First, the reading on a single spirit level is not completely accurate. Secondly, human error in reading a spirit level may cause further error in judging the evenness of the plane of a surface.

The modern trend in layout tool innovation has been towards adjustable instruments whose arms pivot to varying degrees. One example of this trend is the '677 patent, which discloses an layout tool whose members slide at the intersection or 90° angle opposite of the hypotenuse, lockably secured by a rivet. Meek, U.S. Pat. No. 5,414,938, also discloses a measuring tool utilizing two straight edges that rotate about an axis and are further connected by an arm that slides axially on one of the straight edges. Layout and measuring tools defined by adjustability of their arms, legs, or members may offer the benefits of setting and marking different angles from a reference line. The accuracy of those angles, however, will always be suspect when movable parts and semi-permanent affixations allow the possibility of disturbing the accuracy of the stated angle of such a device through the warping of these movable parts. Examples in the field also utilize a thin width of the sides and base, which encumbers their use by often slipping off the mark. Hiltz, U.S. Pat. No. 4,745,689 discloses a magnetized layout tool for securing it to metallic surfaces. Many applications requiring layout tools, however, deal with non-magnetized surfaces, as applied in endeavors of tiling, carpentry, and masonry. Such applications include laying out a non-horizontal surface, where a hands-free tool would greatly benefit a user in chalking out or extending lines without the encumbrance of holding the tool steady. Furthermore, measurement inaccuracies of any variety are magnified when sequential markings are extended from the referenced original mark.

Though present tools in the arts may facilitate angle variation of limited scope, the prevailing angle used in tiling cuts is the 45° angle. This angle's popularity in the tiling industry stems from the ease and simplicity of making a simple bisecting cut on a square tile (the normal tile shape). However, when tile layouts of the 45° cuts or the 30°-60°-90° cuts reach a wall, they end in an uneven manner. This has two consequences. First, the uneven manner in which the wall-abutting tiles are cut to fit the wall is aesthetically unappealing. Second, having different cuts for each wall-abutting tile wastes a tremendous amount of tile pieces left over from the uneven cuts and forces the tiler to expend extra time making the wall-abutting tile cuts.

Another trend in layout tool innovation implements laser technology to shoot lines over long distances. Levelite Technologies manufactures some examples of laser technology in leveling or layout tools. Most of these as well as other laser layout technologies are implemented separate from the traditional layout tool.

The tools discussed here and other examples of layout tools combine fewer functions or tasks than are generally desired by tradepersons, and so additional tools or instruments must be used or carried to perform the omitted functions.

As can be seen, there is a need for a tool whose widespread function eliminates the need for other tools. At the same time, the need exists for a tool that does not require a tiler, carpenter, mason, or other craftsman to need assistance from another worker and retains or improves the accuracy necessary for a precise floor and non-horizontal floor layout.

SUMMARY OF THE INVENTION

The invention provides a tool and a method for centering and laying tile upon a substantially quadrilateral surface, oriented either vertically or horizontally, that is typically found in residential construction on walls or floors.

In one aspect of the invention, a multi-functional level in the form of an isosceles triangle comprising a base and legs is disclosed. The base measures three feet and may be impressed with a standard scale extending from one end to the other end. The legs each measure twenty-five and nine/sixteenths inches in length and also may be impressed with a standard scale extending from one end of the leg to the other. The base may have two centrally positioned spirit levels proximal to each other. The base may further have two plumbing levels located separately and distally from each other for redundant referencing. The base may also have at least one elongate aperture for grasping. Each leg may be comprised of a plurality of centrally positioned spirit levels proximal to each other. Each leg may also have a plurality of plumbing levels for redundant referencing, and at least one elongate aperture for grasping. On the interior of a first side of a first leg is a scale measuring angles from 0° to 45° referenced from an apex where the base and the second leg are joined. Similarly, on the interior of a second side of the second leg is a scale measuring angles from 0° to 45° referenced from an apex where the base and the first leg are joined. The apexes where the base meets each leg further comprise locations of attachment for a chalk line clip.

In another aspect of the invention, a method for chalking lines on a surface is provided for use with a combination level having a base with a first apex having a blunted end and a second apex having a blunted end on either ends of the base. The method comprises the steps of establishing a point of initial reference upon a surface of interest; marking at least one point of a line along an angle of interest using an outer edge of the base as the guide; attaching a chalk line to a selected apex, the apex and the tool constructed with a thickness of approximately 0.5 inches, the blunt end of the apex further having a height of approximately one eighth of an inch, wherein a chalk line clip may be secured to the selected apex; and extending the chalk line along the two points with the chalk line clip attached to the combination level, whereby a task of chalking a line may be performed by one person rather than two.

In another aspect of the invention, a method for centering and laying tile upon a substantially quadrilateral surface is provided, the method comprising the steps of establishing a best wall of the room, the best wall being indicated by the wall's straightness and levelness using the tool of the present invention; creating an interior square, the interior square being extrapolated from the best wall by measuring out from various points of the best wall a distance, then using a resulting interior reference line to find and create the other lines while cross-checking the distance to non-best walls to average out inaccuracies, utilizing the tool of the present invention; finding a center of the room through a centering means using the interior square, utilizing the tool of the present invention; splitting a tile into equal squared and bisected portions and aligning the center split edge of the split tile upon the center of the room; orienting a corner of the split tile diagonally; and placing the tool of the present invention.

These and other features, aspects and advantages of the present invention will become better understood with reference to the following drawings, description and claims. For a better understanding of the invention, its operating advantages, and the specific aspects attained by its uses, reference should be made to the accompanying drawings and descriptive matter in which there are illustrated preferred embodiments of the invention. The foregoing summary has outlined some of the more pertinent aspects of the invention that should be construed to be merely illustrative of some of the more prominent features and applications of the present invention. Many other beneficial results can be attained by applying the disclosed invention in a different manner or by modifying the invention within the scope of the disclosure. Accordingly, other aspects and a fuller understanding of the invention may be understood through a thorough reading of the detailed description of the preferred embodiments in addition to the scope of the invention illustrated by the accompanying drawings.

DETAILED DESCRIPTION OF THE INVENTION

The following detailed description shows the best currently contemplated modes of carrying out the invention. The description is not to be taken in a limiting sense, but is made for the purpose of illustrating the general principles of the invention and the best mode for practicing the invention, since the scope of the invention is best defined by the appended claims.

The invention provides an innovative tool and method of aligning and laying ceramic tile in confined enclosures commonly found in residential construction, such as shower stalls or fireplace interiors. The method of the invention utilizes the inventive tool to lay out tile in a pattern that minimizes the number of cuts required to fit the outermost tile segments to the edges of a rectangular surface as well as provide a decorative aspect to the tile arrangement.

Figure 1:
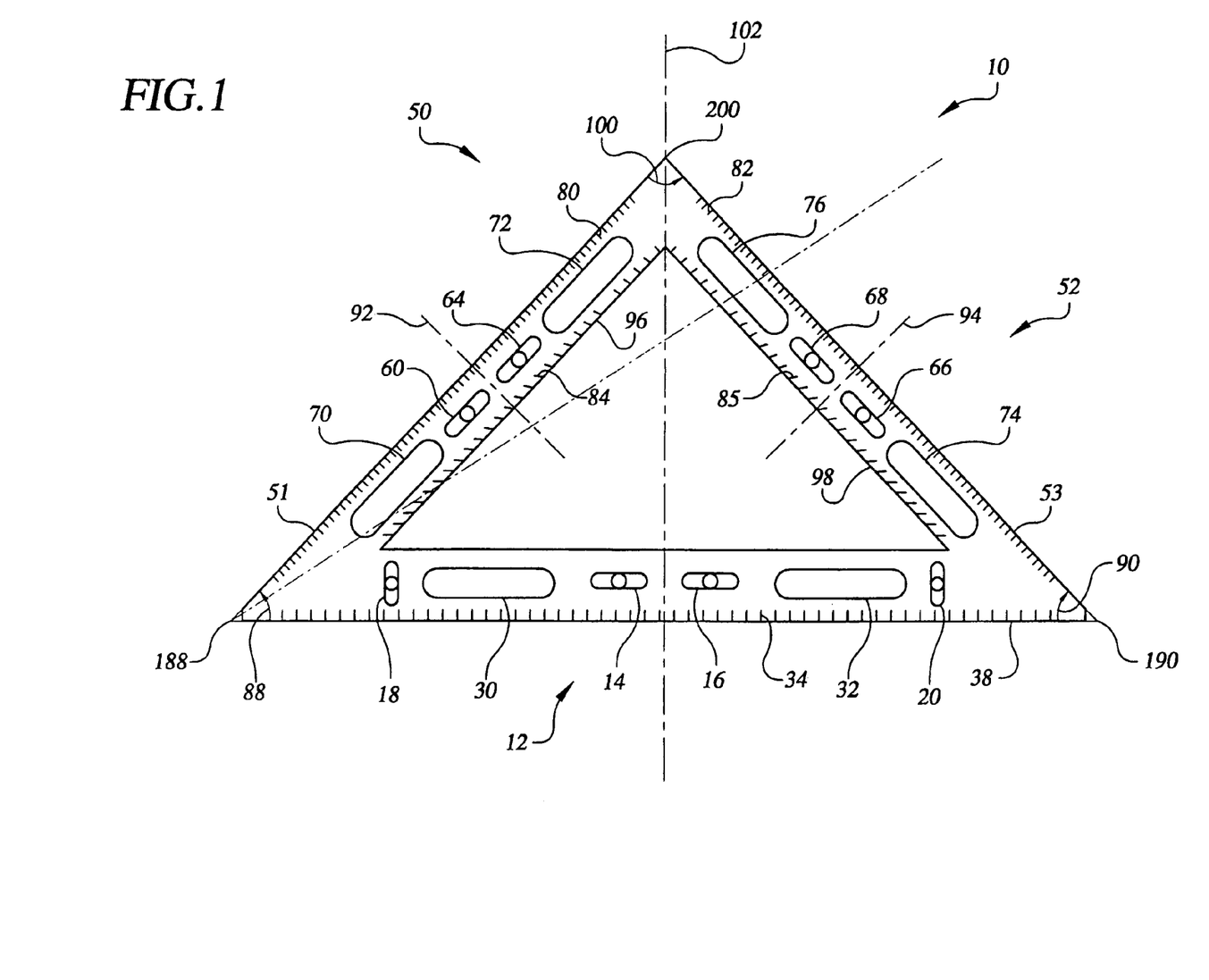
FIG. 1 is a top plan view of the device, according to an embodiment of the invention.

Referring to FIG. 1, an embodiment 10 of the invention is shown. It is formed as an isosceles triangle with a base 12 and equal length legs 50 and 52. It may be constructed of a durable material such as lightweight steel, molded plastic, extruded aluminum, or other such rigid materials known in the art. The material may have a suitable thickness to ensure stability, with a thickness of approximately 0.5 inches being preferred. Furthermore, the steel versions of tool 10 may optionally be magnetized, and steel or aluminum versions may be anodized for enhanced use. A magnetized tool allows the user to fixedly attach tool 10 to a metal surface, allowing the user to take measurements in situations requiring the use of both hands away from tool 10, or to anchor tool 10 to a substrate when finding a plumb level to the floor or other horizontal surface. Tool 10 further has angles 88, 90, and 100. Angles 88 and 90 each measure 45° and are opposite legs 52 and 50, respectively. Angle 100 measures 90° and is opposite to base 12. Apexes 188, 190, and 200 are located at the outer points of respective angles 88, 90, and 100. Base 12 may extend to a length of approximately thirty-six inches (36"), with ruler markings 34 marking the distance between apex 188 and apex 190 for use specifically in shower and bathtub filing applications or fireplace masonry, where the dimensions are typically three and a half feet wide. Base 12 may also extend between twenty-four inches (24") and forty-eight inches (48") for other applications.

A pair of referencing levels 14, 16 are located on base 12, one to each side of centerline 102. Referencing levels 14, 16 are parallel with the edge 38 of base 12 to provide an accurate indication of the amount that edge 38 diverges from the horizontal plane. It has been found that two referencing levels set a substantial distance apart may provide superior accuracy over a single referencing level since the errors found in either referencing level tend to cancel each other out. Many types of levels are well known in the arts to provide qualities of durability and concise readings; for instance, solid block acrylic level vials may be utilized as the reference levels. Elongate apertures 30, 32 may be located within the base 12 between apexes 188, 190 and referencing levels 14, 16. The elongate apertures 30, 32 are axially oriented to the base 12 and serve as handles by which a user's hand may perpendicularly approach and grasp the base 12 through apertures 30, 32. Plumbing levels 18, 20 may be positioned at the extreme ends of base 12 between the elongate apertures 30, 32 and angles 88, 90 and may be oriented perpendicularly to edge 38 of base 12. The plumbing levels 18, 20 provide an indication of how much a vertical surface diverges from the vertical plane whenever edge 38 is brought into contact with the vertical surface. The upper edge of base 12 may also comprise a notch at the centerline 102 that may hold yet another level not shown.

Legs 50 and 52 are equal in length; for example, for a 36" base, each leg 50, 52 would measure approximately 25 9/16 inches. A pair of duplicating referencing levels 60, 64 may be located on leg 50, one to each side of and adjacent to centerline 92. Referencing levels 60, 64 may be parallel with edge 51 of leg 50 to provide an accurate indication of the amount that a horizontal surface diverges from the horizontal plane whenever edge 51 is aligned with the horizontal surface. Duplicate referencing levels may be provided to improve accuracy of the measurement, though it is considered within the scope of the present invention to use one reference level on legs 50, 52. Elongate apertures 70, 72 may be located within the leg 50 between angles 88, 90 and referencing levels 60, 64, respectively. The elongate apertures 70, 72 may be axially oriented to the leg 50 and may serve as handles. As with leg 50, leg 52 may feature a pair of referencing levels 66, 68 located on leg 52, one to each side of and adjacent to centerline 94; referencing levels 66, 68 may be parallel with edge 53 of leg 52. Elongate apertures 74, 76 may be located within the leg 52 between angles 90, 100 and referencing levels 66, 68, respectively. The elongate apertures 74, 76 may be axially oriented to the leg 52 and serve as handles. Without departing from the scope of the present invention, it is foreseen that legs 50 and 52 may have only one elongate aperture.

Leg 50 may have ruler markings 80 indicating the measurements of distance between the apex 188 and apex 200. Leg 50 also may have angular markings 84 upon interior edge 96, to indicate angular measurements taken at apex 190 from edge 38 of base 12. Similarly, the exterior edge 53 of leg 52 may have ruler markings 82 indicating the measurements of distance between the apex 190 and apex 200. Leg 52 may also have angular markings 85 upon interior edge 98 to indicate angular measurements taken at apex 188 from edge 38 of base 12. The opposing surface of tool 10 may be a mirror image of the face shown in FIG. 1 and may have all ruler markings featured on the face shown, thus making the tool accessible for right or left-handed users. Practically, a right side of the tool 10 may have angular markings 85 for right-handed people while on the opposing surface a left side of the tool 10 may have angular markings 84 for left-handed people.

Sufficient material may be removed from apexes 188, 190 so that they are blunted, or do not terminate at a sharp point, but accommodate the thickness of a chalk line clip 240 (FIG. 3) and still maintain accuracy, as shall be presently seen.

Figures 2, 3:
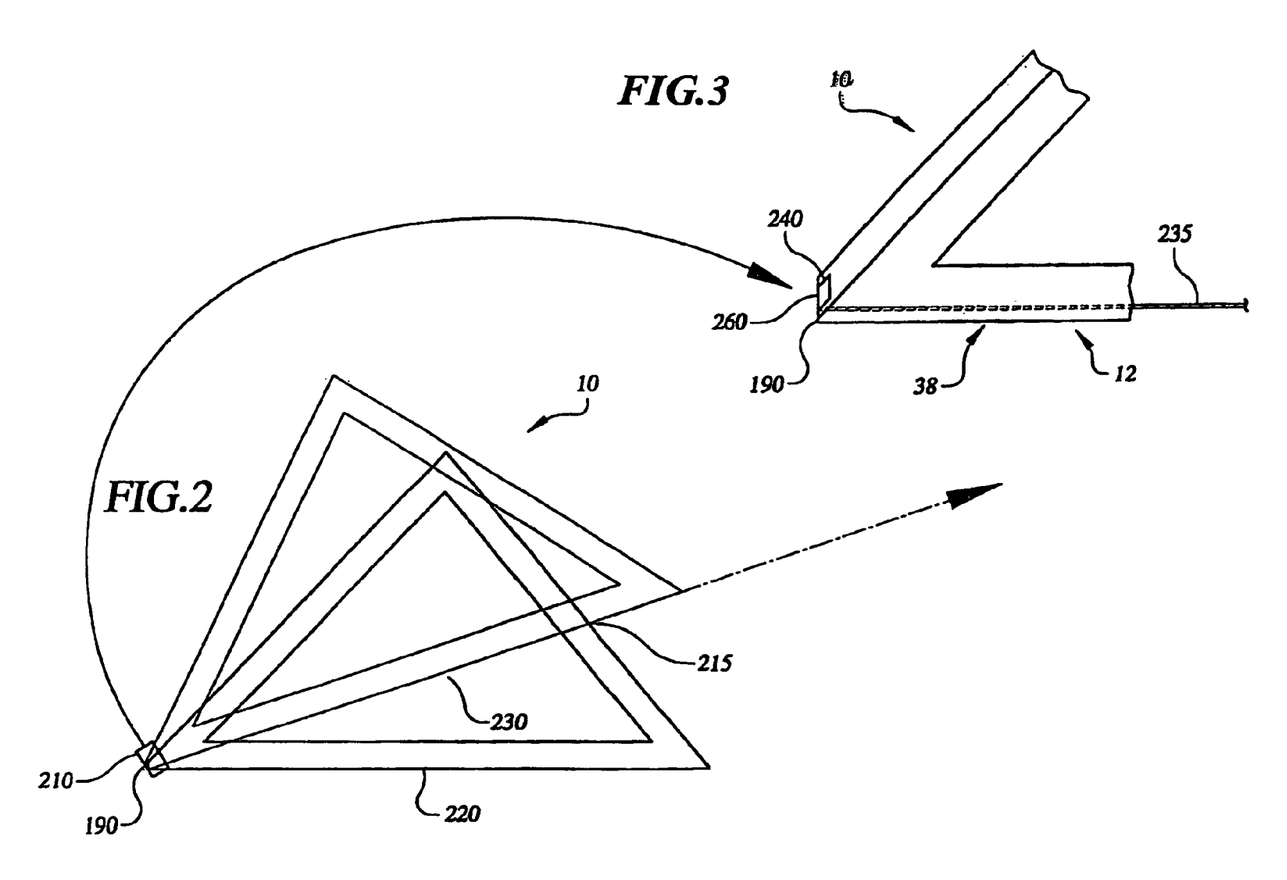
FIG. 2 is a side view showing the device in use to find a divergent angle from a point of interest, according to an embodiment of the invention.
FIG. 3 is a side perspective view depicting the device attached to and extending a chalk line, according to an embodiment of the invention.

Referring now to FIG. 2, tool 10 may be advantageously utilized by an individual tiler to extend straight lines on a horizontal surface. If such straight lines need be a divergent angle of interest from a point of initial interest 210 on a horizontal or vertical surface 220, then a user of tool 10 may align the point of initial interest 210 with the apex 188, for example. The user may then mark at the point of angular interest 215. Using a straight edge such as the outer edge 230 of base 12 to connect the point of angular interest 210 with the point of initial interest 210, the user of tool 10 may map out a straight line from which to extend through the use of laser or chalking. Such straight lines may be marked by the tiler on a horizontal surface 220 by using a device known to those familiar with the art as a chalk line or a snapline. In use, a first end of the chalk line 235 is secured to the surface to be marked, the second end of the chalk line 235 is extended and similarly secured, and the chalk line is "snapped" against the surface to leave a straight line of chalk. A clip 240 is usually provided for the first end of the chalk line 235 to provide a point of attachment 250 for the chalk line 235 to the surface. Tool 10 may be employed by an individual tiler without assistance, in order to snap a chalk line coincident to and extending from the straight edge 38 on the base 12. Referring to FIG. 3, the first end of the chalk line 235 may be clipped to either of apexes 188, 190 of tool 10, depending upon the direction of the extended line. Tool 10 may have a thickness of approximately 0.5" at apexes 188, 190 and a blunted end 260 having a height of approximately 0.125". These general dimensions may allow the clip 240 to be held in secure attachment to either of apexes 188, 190, because the dimensions are similar to chalk line clips generally known in the arts.

When snapping a chalk line on a horizontal surface, an individual tiler can align edge 38 of base 12 in the desired direction and immobilize the tool 10 in a position by placing a heavy object such as a tool box, a bucket, a concrete block, or similar weight on top of the tool 10. The chalk line clip 240 may attached to one of the apexes 190, 188. Apexes 188, 190 may comprise a blunted end 260 designed to receive and hold a conventional chalk line clip securely. The individual tiler may then stretch the chalk line along and beyond the straight edge 38 to a desired end point, then snap the chalk line upon the line extension of edge 38.

In another aspect of the invention, an attachment means may be used to fix the tool 10 to a vertical surface. For example, a detachable bracket (not shown) attached to leg 50, leg 52, or base 12 may be used to fix the tool 10 to the vertical surface. Another example may be the use of drywall screws threaded through a plate and bored into the vertical surface to provide a steady anchor to the surface. Users of the tool 10 may find the bracket useful when finding the plumb to a horizontal surface below the tool 10 when tool 10 is anchored to a wall or other vertical surface. A spacer may be located between the edge of the tool 10 and the vertical surface to enable the user of tool 10 to displace the tool 10 from the wall to a point where a user may use the plumbing levels 18 and 20 to advantageously find the true vertical to a horizontal surface. In still another aspect of the invention, a detachable laser may attach to the tool 10 by any means known in the arts.

Tool 10 may also be advantageously used to lay out horizontal and vertical lines in confined spaces that are normally found in residential construction, namely, shower stalls, bathtub enclosures, and fireplaces. The length of base 12 of tool 10 is such that it may extend substantially across a standard shower stall wall, which typically has a minimum width of approximately 36". Reference levels 14, 16 may facilitate the determination of horizontal lines coincident with edge 38 along a vertical surface. Thus tool 10 may be used for vertical surfaces typically found in bathrooms and fireplaces without resorting to extending the horizontal lines as with smaller levels.

Figure 4:
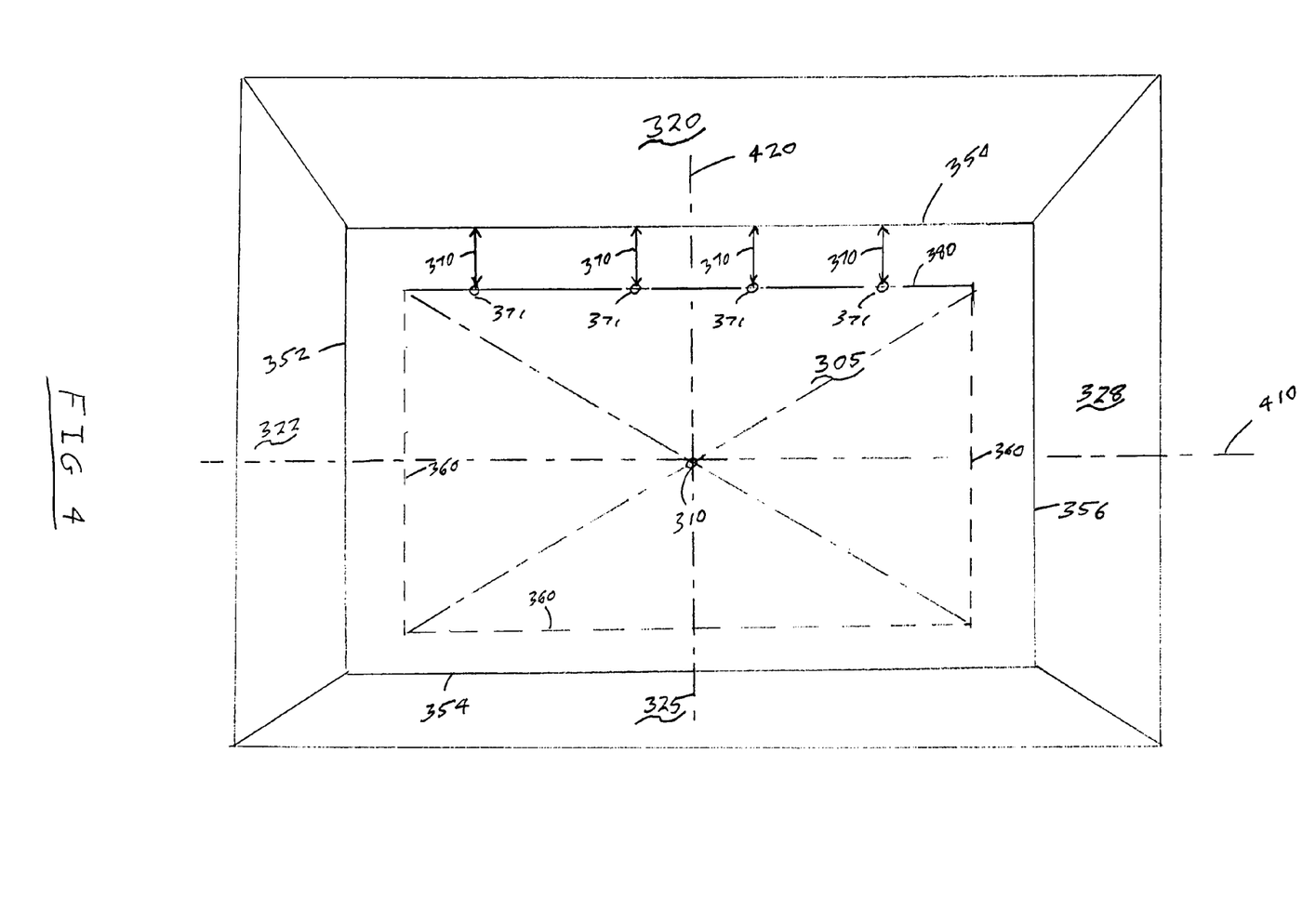
FIG. 4 is a top perspective view showing the floor of a room surrounded by four walls, the floor having an interior square, according to an embodiment of the invention; and, FIG. 5a is a top plan view showing the marked lines offset from the interior square, detailing the use of the device to lay out an initial tile in the quadrilateral surface, according to an embodiment of the invention.

Referring now to FIG. 4, a method using tool 10 is provided for laying out and tiling a horizontal or vertical quadrilateral surface, such as floor 305, by way of an illustrative example, with a grid of square tiles. The method has the advantage, because of the 26.5° at which the tile is laid, of reducing waste tile along the perimeter of the quadrilateral surface so that approximately 95% of the square tile may be usable for the tiling job. The tool 10 provided by the invention may enable the laying out of the tiling pattern to be performed easily and without problems. However, rooms and floors are seldom perfectly level or aligned by 90° angles. As a practical matter, it may be necessary to determine an imaginary interior rectangle 360 within the perimeter of the quadrilateral surface from which to align the square tiles, so that the irregularities of the walls and floor may be compensated for and the most advantageous positioning of the center 310 may be determined.

The first step of the method may be to determine a center 310 of the floor 305. The center 310 may be used as a reference point from which an initial tile 300 may be oriented and placed. Initial tile 300 may then be surrounded by additional tiles in a substantially contiguous relationship so that the perimeter tiles of the floor 305 all have substantially the same angled cut along the perimeter.

One way to determine the center 310 may be to determine a best wall 320 according to how well the best wall 320 maintains its vertical level and lateral level at the wall base 350. If more than one wall meets this criterion, then the tiler may use more than one wall to find the center 310, by first finding an interior rectangle 360 extrapolated from an average or mean of the four walls against the best wall 320. The tiler may then lay out the interior rectangle 360 by marking a series of two or more points 371 that are a determined distance 370 from the best wall 320, and then using a resulting interior reference line drawn through the series of points to locate and create the other lines in the interior rectangle 360, while cross-checking the predetermined distance to non-best walls 322, 325, 328 for averaging out the inaccuracies. The term "average or mean" means that the tiler may use the best wall 320 to reference the other walls, thus eliminating the inaccuracies of the non-best walls 322, 325, 328. From the interior rectangle 360, the tiler may locate the center 310 at the intersection of the two diagonals of interior rectangle 360, using a method well known in the tiling art.

It should be noted that the method of the invention may also be practiced without finding the true center 310 of a floor 305. However, use of the true center 310 of the floor 305 may provide a cleaner and more symmetric appearance to the room's tile arrangement. Furthermore, the inventive tool disclosed herein may be used to perform all the tasks necessary to find the true center 310 of the floor 305, including measuring distances from the best wall 320 and applying extended chalk lines to create the interior rectangle 360.

After finding the true center 310 using the above method or by other methods well known in the industry, the tiler may then orient the first tile. Assuming that square tiles to be used on the floor 305, a square tile may be bisected into two generally equal rectangular halves, to provide a tile half 400.

Figure 5A:
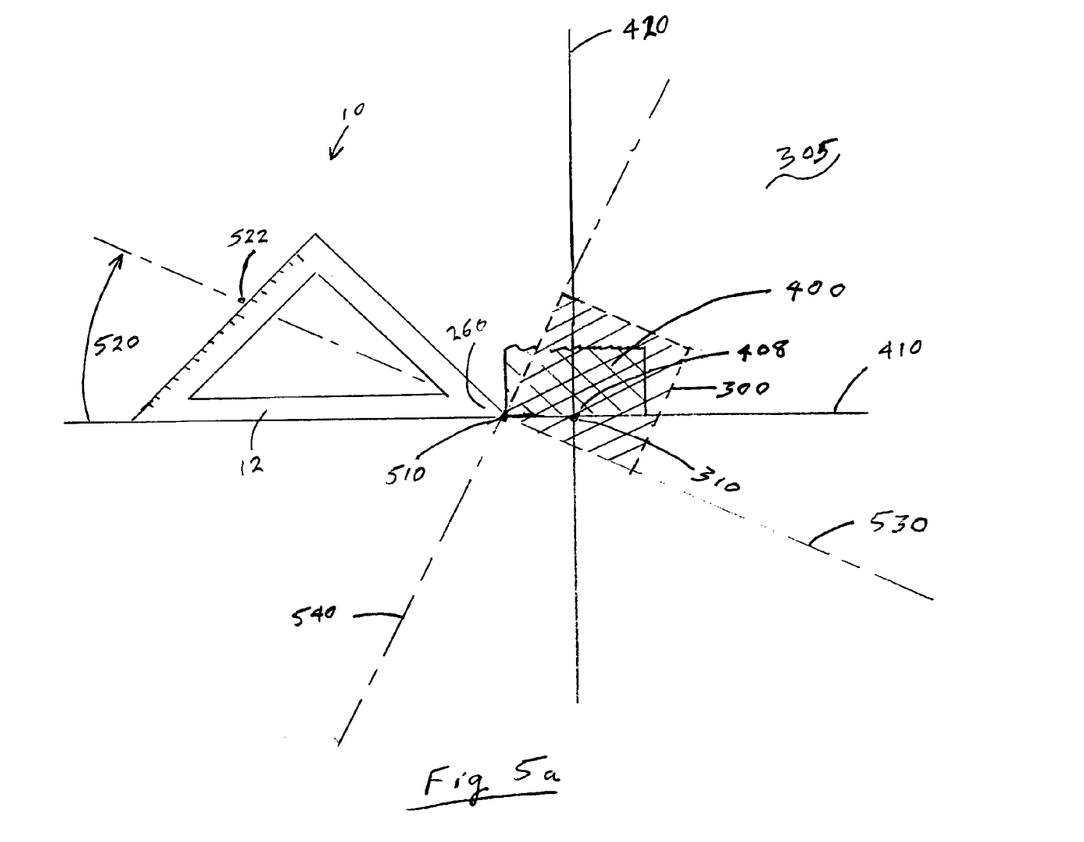

Referring now to FIG. 5, tile half 400 may be used to orient an initial tile 300. For purposes of illustration and not limitation, the room may be viewed as having an x-axis 410 and a y-axis 420 each drawn for reference through the center 310 and perpendicular to the sides of the interior rectangle 360 (FIG. 4). The tiler may then may place a midpoint 408 of the full side of the tile half 400 at the center 310 and aligned with the x-axis 410. The tiler may then place the base 12 of the tool 10 along the x-axis 410 and butt the apex 190 to tile half 400. The tiler may then mark a point 510 on the x-axis 410 at the apex 190. Using point 510, the tiler may then mark a point 522 representing an angle 26.5° according to the ruler markings 80. The tiler may then move the base 12 of the tool 10 to connect the points 510, 522 with a line 530 intersecting the x-axis 410 at angle 520. The tiler may then extend line 530 past the x-axis 410 approximately another length of the base 12 of the tool 10. Finally, an edge of the initial tile 300 may be placed with a corner at point 510 and the edge associated with that corner aligned with line 530 so that the initial tile 300 covers center 310. A line 540 may be drawn along an adjacent edge of initial tile 300, so that lines 530, 540 serve as axes for a new coordinate system that is both translated and rotated from the center 310 of floor 305.

Figure 5B:
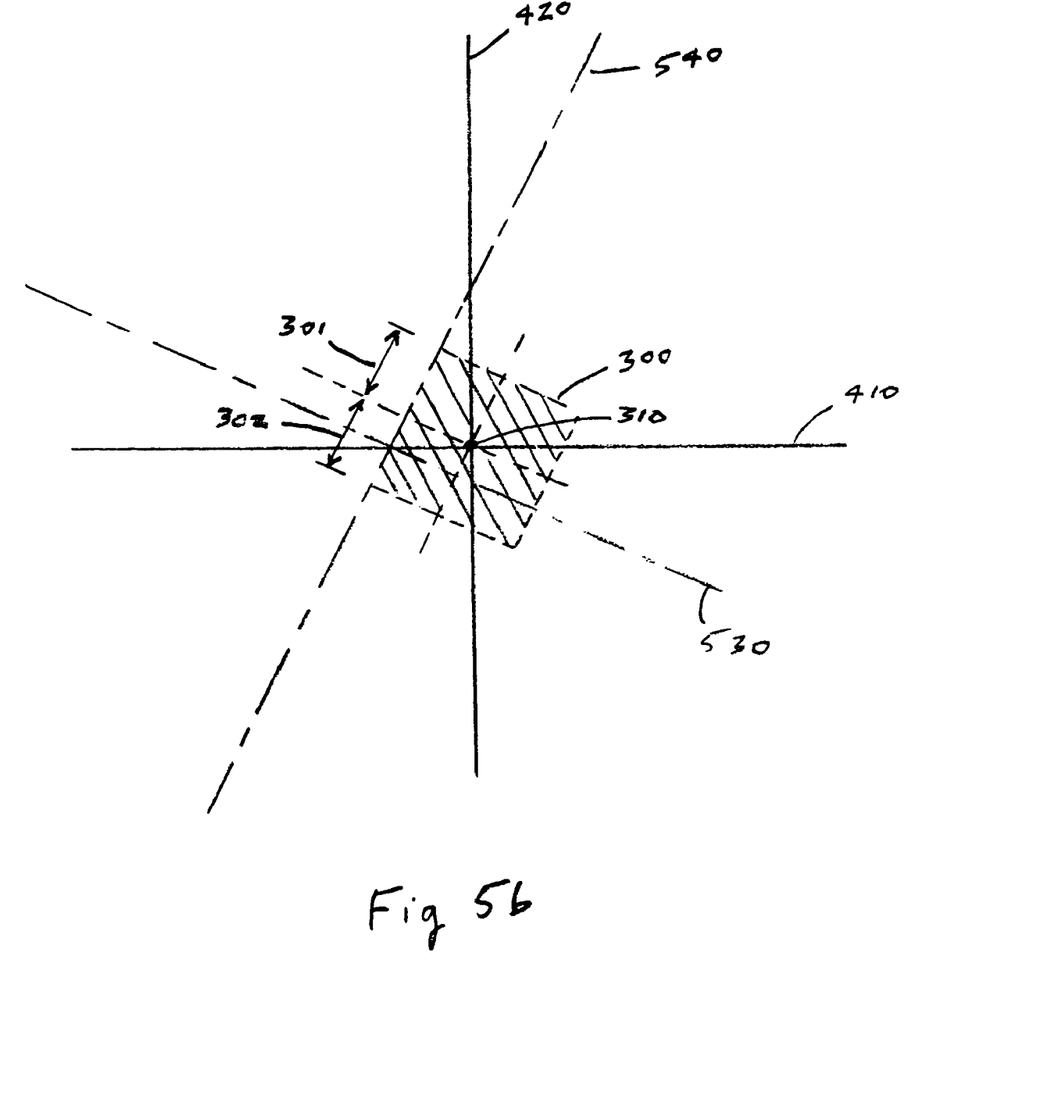
FIG. 5b is a top plan view showing the marked lines offset from the interior square, detailing the use of the device to lay out the initial tile from the intersection of the marked lines after adjusting the position of the initial tile, according to an embodiment of the invention.

The tile 300 is next moved along the line 540 until the center 310 of the room is at the approximate center of tile 300. This may be accomplished as shown in FIG. 5b by moving tile 300 along line 540 until a line drawn parallel to line 530 and passing through center 310 bisects an edge of tile 300 into two equal lengths 301, 302.

Figure 6:
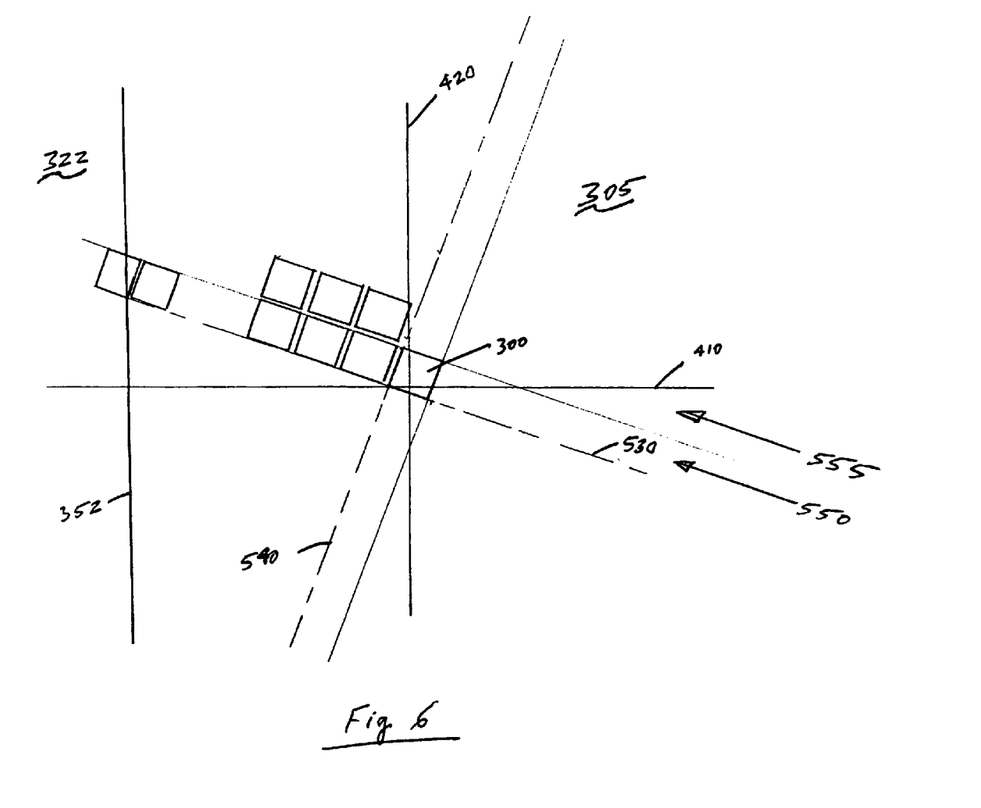
FIG. 6 is a top plan view showing the columns of tiles as a tiler lays an initial tile from a point formed from the intersection of the marked lines.

Referring now to FIG. 6, the tiler may begin laying out a full tile column 550 alone or in groups, preferably groups of two columns 550, 555. The full tile column 550 may be squared from the initial tile 300, the tiler laying each tile column 550 from line 540 across the floor 305 to a wall 522. The tiler may sequentially measure each tile column 550, beginning with the initial tile 300, from line 540 to the next tile column 555. The tiler may compensate for the approximately uniform width of fill material between the tiles. Fill material may be grout or any other material generally used in to the art to fill gaps between tiles. When the tile column 550 reaches the wall 322, an individual tile 570 of the tile column 550 may encounter an intersection 352 between the floor 305 and the wall 322, which requires cutting a tile 570 into complementary sections 573, 576.

Three angles of the complementary tile sections 573, 576 may have approximate angle values of 26.5°, 90°, and 63.5°. The complementary tile sections 573, 576 resulting from the cut individual tile 570 form triangular complements of each other, and may be set contiguous to the wall line 565, the first tile section 573 set on the floor and the second tile section 576 set on a non-horizontal surface 580. The non-horizontal surface 580 may be a vertical wall.

To continue tiling upon a non-horizontal surface 580 such as a vertical wall, place the second tile section 576 of the upon the non-horizontal surface 580 so that the section 576 butts up 90° of, or perpendicular to, the wall line 565. Furthermore, the edge lines 550 of tile column continue in a linear manner up or onto the non-horizontal surface 580 such as a vertical wall.

An inventive aspect of the present tiling technique is seen in the way that the individual tile 570 lies at a 26.5° angle from the wall line 565, mimicking the first tile's 300 26.5° adjustment off the x-axis angle from the adjusted marked line.

As has been demonstrated, the present invention provides an improved and advantageous tool for laying out horizontal and plumb lines both on a large floor and in a confined space by an individual workman without resorting to assistance by another workman. While the preferred embodiments of the present invention have been described, additional variations and modifications in those embodiments may occur to those skilled in the art once they learn of the basic inventive concepts. Therefore, it is intended that the appended claims shall be construed to include both the preferred embodiment and all such variations and modifications as fall within the spirit and scope of the invention.

I claim:

1. A combination level comprising
a body having an outer shape of an isosceles triangle, the body comprising an elongate base, an elongate first leg, and an elongate second leg, the legs being of equal length, the first leg and the base meeting to form a first outer apex, the second leg and the base meeting to form a second outer apex, the first and second apex each having a blunted end and the body having a sized uniform thickness to allow removable attachment of a chalk line clip at a selected one of the apexes;
the base with a base outer edge, the base having a pair of centrally positioned referencing levels, the levels aligned one to each side of a base centerline in close proximity with one another and parallel with the base outer edge, the base having distally positioned plumbing levels perpendicularly aligned with the base outer edge, the base with at least one elongate opening therethrough, the base further having ruler markings; and
the legs each having a leg outer edge, the legs each having a pair of centrally positioned referencing levels, the levels aligned one to each side of a leg centerline in close proximity with one another and parallel with the leg outer edge, the legs each having at least one elongate opening therethrough.

2. The combination level described in claim 1, wherein the body is composed of a material chosen from the group consisting of stainless steel, plastic, wood, and aluminum.

3. The combination level described in claim 1, wherein the length of the base is sized so that it extends a substantial length of a standard shower stall typically found in home construction.

4. The combination level in claim 1, wherein the height of the blunted end is approximately between one eighth of an inch and three-sixteenths of an inch.

5. The combination level in claim 1, wherein the width of the body is approximately between one-fourth of an inch and five-eighths of an inch.

6. The combination level described in claim 1, wherein the length of the base is approximately 36 inches.

7. The combination level described in claim 1, wherein the length of the base is between 24 and 48 inches.

8. The combination level described in claim 1, wherein each outer edge of the legs and the outer edge of the base have ruler markings, and an interior edge of a selected one of the legs having angular markings indicating the amount of angular displacement taken about the apex opposite the at least one leg.

9. A method for centering and laying tile thereupon a substantially quadrilateral room, the method comprising
establishing a best wall of the room, the best wall being indicated by the wall's straightness and levelness using the tool from claim 1,
creating an interior square, the interior square being extrapolated from the best wall by measuring out from various points of the best wall a distance, then using a resulting interior reference line to find and create the other lines utilizing the tool from claim 1, the interior square comprising an x-axis from a center of the best wall and a y-axis from a center of an adjacent wall;
finding a center of the room using the interior square by utilizing the tool from claim 1, the center of the room being approximately the intersection of the x-axis and the y-axis,
orienting a tile half approximately 26.5° of the x-axis, and abutting the blunted edge of the tool from claim 1 to a non-split side of the split tile,
extending chalk lines from the side of the tile half associated with the x-axis to create an adjusted marked line using the tool from claim 1,
laying out tiles using the adjusted marked line for reference and the tool from claim 1,
cutting wall-abutting tiles into 26.5°-63.5°-90° cuts creating complimentary tile sections, whereby the wall-abutting tiles have a uniform cut and appearance.

10. The method of centering and laying out tile in claim 9, the method further comprising
placing triangular complements of the complementary tile sections upon the wall so that they line up and complement the wall-abutting tiles, whereby the edge lines of each individual tile column continue in a linear manner up or onto the walls.

11. The method of centering and laying out tile in claim 9, the method further comprising
finding a true center of the room.

12. The method of centering and laying out tile in claim 9, the method further comprising
cross-checking the distance to non-best walls to average out inaccuracies.

13. The method of centering and laying out tile in claim 9, the method further comprising halving a tile in equal squared portions, aligning a midpoint of a tile halve upon the center of the room.

14. The method of centering and laying out tile in claim 9, wherein the tile half is formed from any tile of a quadrilateral shape.

* * * * *